(12) United States Patent
Sarathy et al.

(10) Patent No.: US 12,474,365 B2
(45) Date of Patent: Nov. 18, 2025

(54) USER POSTURE TRANSITION DETECTION AND CLASSIFICATION

(71) Applicant: Apple Inc., Cupertino, CA (US)

(72) Inventors: Aditya Sarathy, Santa Clara, CA (US); Umamahesh Srinivas, Milpitas, CA (US); Bharath Narasimha Rao, San Mateo, CA (US); Alexander Singh Alvarado, San Jose, CA (US); Xiaoyuan Tu, Sunnyvale, CA (US); Jonathan Michel Beard, San Jose, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 17/349,883

(22) Filed: Jun. 16, 2021

(65) Prior Publication Data

US 2021/0396779 A1   Dec. 23, 2021

Related U.S. Application Data

(60) Provisional application No. 63/041,907, filed on Jun. 20, 2020.

(51) Int. Cl.
  *G01P 15/02* (2013.01)
  *G01P 13/04* (2006.01)
  *G06N 3/08* (2023.01)
  *G06N 7/01* (2023.01)

(52) U.S. Cl.
  CPC .............. *G01P 15/02* (2013.01); *G01P 13/04* (2013.01); *G06N 3/08* (2013.01); *G06N 7/01* (2023.01)

(58) Field of Classification Search
  CPC .......... G01P 15/02; G01P 13/04; G06N 7/01; G06N 3/08
  See application file for complete search history.

(56) References Cited

U.S. PATENT DOCUMENTS

| | | | |
|---|---|---|---|
| 9,142,062 B2* | 9/2015 | Maciocci | .............. G06F 3/0425 |
| 9,459,692 B1 | 10/2016 | Li | |
| 10,169,917 B2 | 1/2019 | Chen et al. | |
| 10,339,078 B2 | 7/2019 | Nair et al. | |
| 11,582,573 B2 | 2/2023 | Tu et al. | |
| 11,586,280 B2 | 2/2023 | Kriminger et al. | |
| 11,589,183 B2 | 2/2023 | Tu et al. | |
| 11,647,352 B2 | 5/2023 | Tam et al. | |
| 11,675,423 B2 | 6/2023 | Akgul et al. | |

(Continued)

OTHER PUBLICATIONS

Jolliffe et al., 2016 Principal component analysis: a review and recent developments. Phil. Trans. R. Soc. A 374: Feb. 2, 2015 (Year: 2016).*

(Continued)

*Primary Examiner* — Arleen M Vazquez
*Assistant Examiner* — Lyudmila Zaykova-Feldman
(74) *Attorney, Agent, or Firm* — Fish & Richardson P.C.

(57) ABSTRACT

Embodiments are disclosed for user posture transition detection and classification. In an embodiment, a method comprises: obtaining, using one or more processors, motion data from a headset worn by a user; determining, using the one or more processors, one or more windows of motion data that indicate biomechanics of one or more phases of a user's postural transition; and classifying, using the one or more processors, as the user's postural transition based on the one or more windows of data.

10 Claims, 13 Drawing Sheets

(56) References Cited

U.S. PATENT DOCUMENTS

| | | | |
|---|---|---|---|
| 2005/0281410 A1 | 12/2005 | Grosvenor et al. | |
| 2012/0114132 A1 | 5/2012 | Abrahamsson et al. | |
| 2014/0153751 A1 | 6/2014 | Wells | |
| 2015/0081061 A1* | 3/2015 | Aibara | A61B 5/1122 700/91 |
| 2015/0302720 A1* | 10/2015 | Zhang | G08B 21/0446 340/573.7 |
| 2016/0119731 A1 | 4/2016 | Lester, III | |
| 2016/0262608 A1 | 9/2016 | Krueger | |
| 2016/0269849 A1 | 9/2016 | Riggs et al. | |
| 2017/0188895 A1* | 7/2017 | Nathan | A61B 5/1118 |
| 2017/0295446 A1 | 10/2017 | Thagadur Shivappa | |
| 2018/0091923 A1 | 3/2018 | Satongar et al. | |
| 2018/0125423 A1* | 5/2018 | Chang | A61B 5/6803 |
| 2018/0176468 A1 | 6/2018 | Wang et al. | |
| 2018/0220253 A1 | 8/2018 | Kärkkäine et al. | |
| 2018/0242094 A1 | 8/2018 | Baek et al. | |
| 2018/0343534 A1 | 11/2018 | Norris et al. | |
| 2019/0121522 A1 | 4/2019 | Davis et al. | |
| 2019/0166435 A1 | 5/2019 | Crow et al. | |
| 2019/0224528 A1* | 7/2019 | Omid-Zohoor | G16H 40/67 |
| 2019/0313201 A1 | 10/2019 | Torres et al. | |
| 2019/0313915 A1* | 10/2019 | Tzvieli | G01J 5/12 |
| 2019/0374161 A1* | 12/2019 | Ly | A61F 2/68 |
| 2019/0379995 A1 | 12/2019 | Lee et al. | |
| 2020/0037097 A1 | 1/2020 | Torres et al. | |
| 2020/0059749 A1 | 2/2020 | Casimiro Ericsson et al. | |
| 2020/0169828 A1 | 5/2020 | Liu et al. | |
| 2020/0323727 A1* | 10/2020 | Agrawal | A61H 1/00 |
| 2021/0044913 A1 | 2/2021 | Haussler et al. | |
| 2021/0064132 A1* | 3/2021 | Rubin | G06F 3/015 |
| 2021/0100480 A1* | 4/2021 | Kang | A61B 5/1123 |
| 2021/0211825 A1 | 7/2021 | Joyner et al. | |
| 2021/0394020 A1* | 12/2021 | Killen | A63B 24/0006 |
| 2021/0397249 A1 | 12/2021 | Kriminger et al. | |
| 2021/0397250 A1 | 12/2021 | Akgul et al. | |
| 2021/0400414 A1 | 12/2021 | Tu et al. | |
| 2021/0400418 A1 | 12/2021 | Tam et al. | |
| 2021/0400419 A1 | 12/2021 | Turgut et al. | |
| 2021/0400420 A1 | 12/2021 | Tam et al. | |
| 2022/0103964 A1 | 3/2022 | Tu et al. | |
| 2022/0103965 A1 | 3/2022 | Tu et al. | |
| 2025/0133363 A1 | 4/2025 | Tu et al. | |

OTHER PUBLICATIONS

Zhang et al., "Template matching based motion classification for unsupervised post-stroke rehabilitation," International Symposium on Bioelectronics and Bioinformations 2011 (Year: 2011).*

* cited by examiner

USER POSTURE TRANSITION DETECTION AND CLASSIFICATION

CROSS-REFERENCE TO RELATED APPLICATION

This application claims priority to U.S. Provisional Patent Application No. 63/041,907, filed Jun. 20, 2020, the entire contents of which are incorporated herein by reference.

TECHNICAL FIELD

This disclosure relates generally to motion classification.

BACKGROUND

Existing mobile devices include motion sensors that provide motion data, such as acceleration and rotation rate of the mobile device. The motion data can be used to classify user activities. For example, a digital pedometer can use acceleration data to count steps to determine that the user is walking or running. The pedometer together with acceleration and rotation rate data can also be used to determine if the user is riding in a vehicle. Although these broad activity classifications are useful for many mobile applications, some mobile applications would benefit from knowing if a user's physical posture has changed, such as standing from a seated position or vice versa. These applications include but are not limited to: head tracking, exercise repetition counting, posture ergonomics and health monitoring, such as the timed up and go test, which is a test recommended by the Center of Disease Control (CDC) whereby a user is asked to sit in a comfortable chair, stand up, walk for ~3 m, turn around, walk back and sit down. The amount of time it takes for a user to do that is indicative of the user's mobility and risk of falling.

SUMMARY

Embodiments are disclosed for user posture transition detection and classification.

In an embodiment, a method comprises: obtaining, using one or more processors, motion data from a headset worn by a user; determining, using the one or more processors, one or more windows of motion data that indicate biomechanics of one or more phases of the user's postural transition; and classifying, using the one or more processors, the user's posture transition based on the one or more windows of data.

In an embodiment, the one or more phases of the user's postural transition include leaning, momentum and extension phases of a sit-to-stand transition.

In an embodiment, the motion data includes measurements of the user's inertial vertical acceleration and rotation about the user's torso.

In an embodiment, time boundaries of the extension phase are determined based on points of zero vertical inertial velocity derived from the user's inertial vertical acceleration, where the points of zero inertial vertical velocity correspond to maximum and a minimum angles of the rotation about the user's torso.

In an embodiment, the user's postural transition is classified based on the one or more windows of motion data and additional motion data captured before and after each of the one or more windows of the motion data.

In an embodiment, the classifying uses at least one of a Naïve Bayes classifier, a deep learning classifier or a motion template matching classifier.

In an embodiment, the classifying uses a Naïve Bayes classifier, and the method further comprises: determining the user's face-forward inertial acceleration from the user's inertial vertical acceleration; determining if the user's face-forward inertial acceleration meets or exceeds a minimum threshold; in accordance with the user's face-forward inertial acceleration meeting or exceeding the minimum threshold, obtaining the one or more windows of motion data including the user's inertial vertical acceleration and the rotation about the user's torso; and detecting, with the Naïve Bayes classifier, the user's postural transition based on the one or more windows of motion data.

In an embodiment, principal component analysis (PCA) is used to determine the user's face-forward acceleration from the user's vertical inertial acceleration.

In an embodiment, the classifying uses a deep learning classifier, and the method further comprises: determining the user's face-forward inertial acceleration from the user's inertial vertical acceleration; determining if the user's face-forward inertial acceleration meets or exceeds a minimum threshold; in accordance with the user's face-forward inertial acceleration meeting or exceeding the minimum threshold, obtaining the one or more windows of motion data including the user's inertial vertical acceleration and the rotation about the user's torso; and detecting, with the deep learning classifier, the user's postural transition based on the one or more windows of motion data.

In an embodiment, the classifying uses a motion template matching classifier, and the method further comprises: comparing a particular window of motion data with template motion data for at least one phase of the user's postural transition; determining a point of maximum correlation with the template motion data based on the comparing of the particular window of motion data with template motion data for at least one phase of the user's postural transition; obtaining a sub window of the particular windows of motion data about the determined point of maximum correlation; determining the user's vertical displacement in the at least one sub window; comparing the user's vertical displacement with a vertical displacement threshold; and detecting the user's postural transition based on the comparing of the user's vertical displacement with a vertical displacement threshold.

In an embodiment, a system comprises: one or more processors and memory storing instructions that when executed by the one or more processors, cause the one or more processors to perform operations comprising: obtaining motion data from a headset worn by a user; determining one or more windows of motion data that indicate biomechanics of one or more phases of the user's postural transition; and classifying the user's posture transition based on the one or more windows of data.

In an embodiment, a non-transitory, computer-readable storage medium stores instructions that when executed by one or more processors, cause the one or more processors to perform operations comprising: obtaining motion data from a headset worn by a user; determining one or more windows of motion data that indicate biomechanics of one or more phases of the user's postural transition; and classifying the user's posture transition based on the one or more windows of data.

Other embodiments can include an apparatus, computing device and non-transitory, computer-readable storage medium.

Particular embodiments disclosed herein provide one or more of the following advantages. User posture transition detection and classification provides context information that can be used improve or enhance a variety of mobile applications.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1:
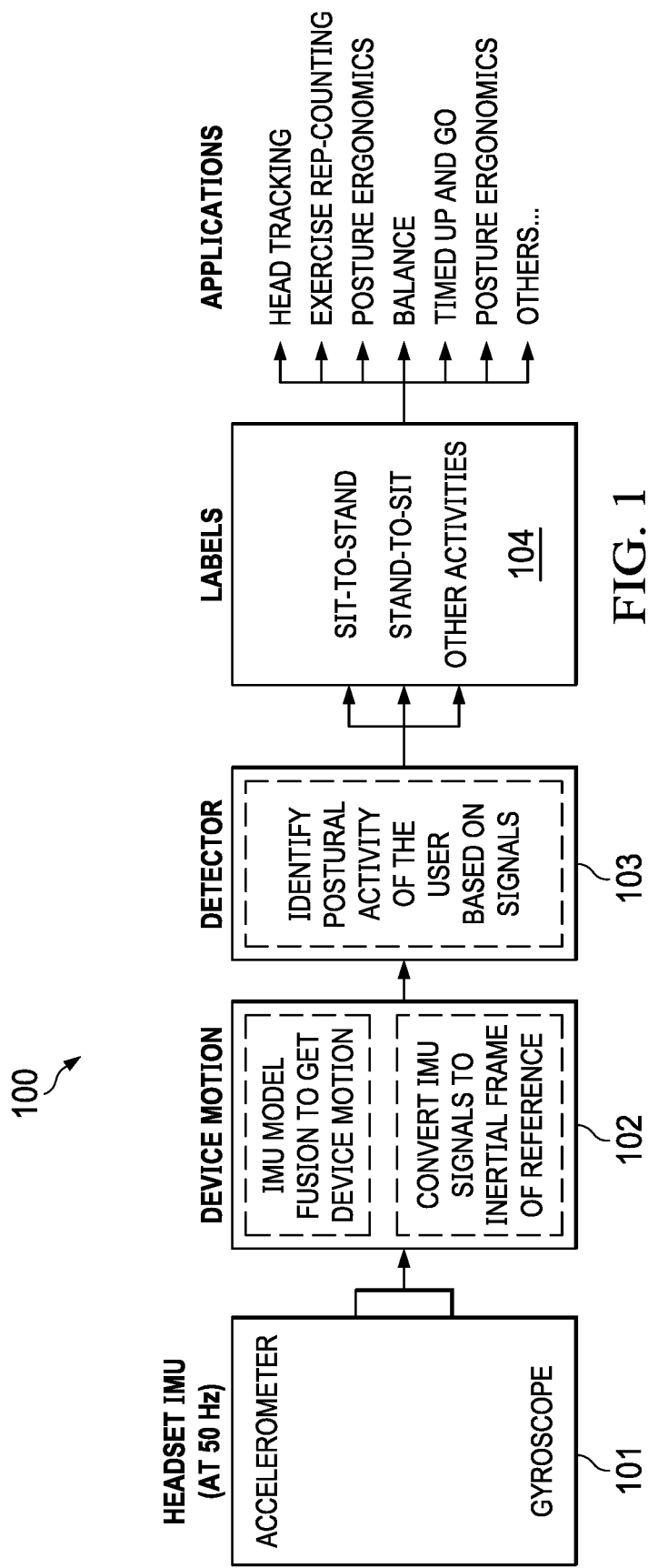
FIG. 1 is a block diagram of a system for user posture detection and classification according to an embodiment.

FIG. 1 is a block diagram of system 100 for user posture detection and classification according to an embodiment. System 100 includes motion sensors 101, device motion model 102 and user posture transition detector and classifier 103. In embodiment, motion sensors 101 include a 3-axis MEMS accelerometer and 3-axis MEMS gyro for providing acceleration and rotation rate data, respectively. In an embodiment, motion sensors 101 are included in a headset worn by a user. A headset can be any body-worn device, including but not limited to: closed and open back headphones, earbuds, ear phones, AR or virtual reality (VR) headsets, smart glasses, etc.

In an alternative embodiment, motion sensors 101 are also included in a companion device communicatively coupled to the headset, such as a smart phone, tablet computer, wearable computer, game console or AV playback system (e.g., a television system). For example, in a spatial audio application, the companion device is a source device for play a visual portion of AV content, and the headset plays the spatial audio portion of the AV content. The companion device binaurally renders the spatial audio content, which is transferred to the headset over a wired or wireless communication channel (e.g., Bluetooth channel) for playback. In such an embodiment, the motion data from the headset and companion device motion sensors are fused in device motion module 102. For example, a relative position and attitude can be calculated by device motion module 102 for use in head pose tracking in a spatial audio application. Tracking using relative motion is useful for determining whether the user's head is turning while their torso is stationary or whether the user's torso has moved. Both types of motion would be sensed by the headset and would be indistinguishable. Generally, the use of motion data from both the headset and companion device will allow more complex user posture transitions to be detected.

Device motion module 102 transforms motion data from the headset and the companion device into a local level inertial reference frame (e.g., North-West-Up coordinate system). If two or more IMUs are used, device motion module 102 also fuses the motion data from the two or more IMUs to generate relative position and attitude, as described above. As describe more fully in reference to FIGS. 3 and 4, motion data in the local level reference frame is analyzed to determine vertical and translation motions which possibly indicate maximum and minimum time boundaries of a particular phase of user posture transition. The maximum and minimum time boundaries are used to determine a window size of motion data samples to be input into one or more classifiers (e.g., a Naïve Bayes classifier, a deep learning classifier, a template matching classifier). The one or more classifiers output one or more labels for the window motion data, such as "sit-to-stand," "stand-to-sit," or any other user posture transition label.

Figure 2:
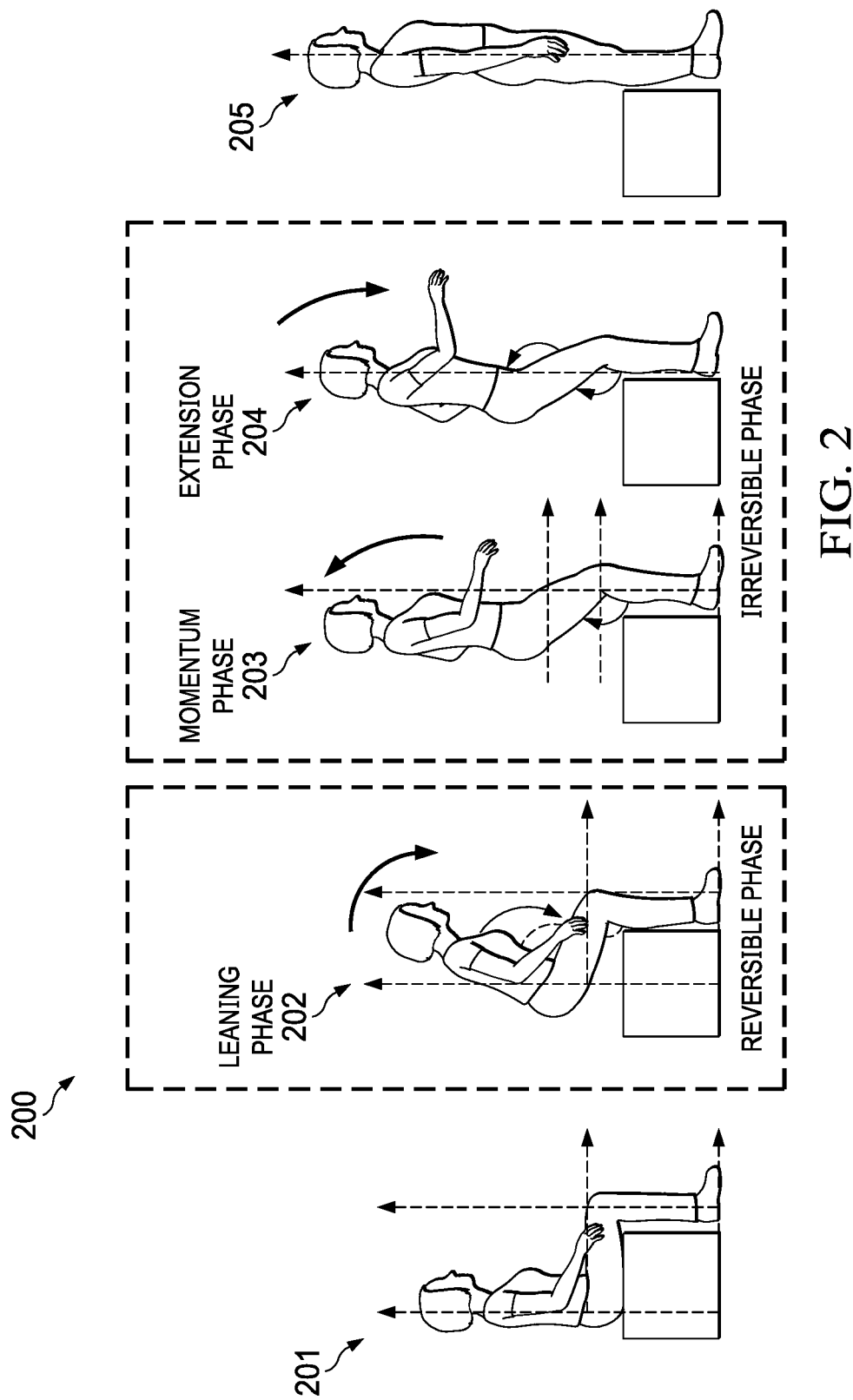
FIG. 2 illustrates the biomechanics of a sit-to-stand posture transition, according to an embodiment.

FIG. 2 illustrates the biomechanics of a sit-to-stand postural transition, according to an embodiment. A user is shown in a seated position 201. When the user starts to stand they enter a leaning phase 202, where user leans her body forward to change her center of gravity. The leaning phase 202 is a reversible phase in that the user can return to her seated position 201. Note that the leaning phase 202 imparts a rotation of the user's torso that can be sensed by a 3-axis MEMS gyro in a headset IMU worn by the user (not shown). After the leaning phase 202, the user enters a momentum phase 203 where the user uses her legs to propel her body to a standing position. Note that the momentum phase 203 imparts a vertical motion which can be sensed by a 3-axis accelerometer in the headset IMU worn by the user. After the momentum phase 202, the user enters an extension phase 204 where the user extends her body in the vertical direction while she leans slightly forward to shift her center of gravity to prevent herself from falling backwards. The momentum and extension phases 203, 204 are irreversible phases as the user cannot go back to a seated position and must continue forward into a standing position 205.

Figure 3A:
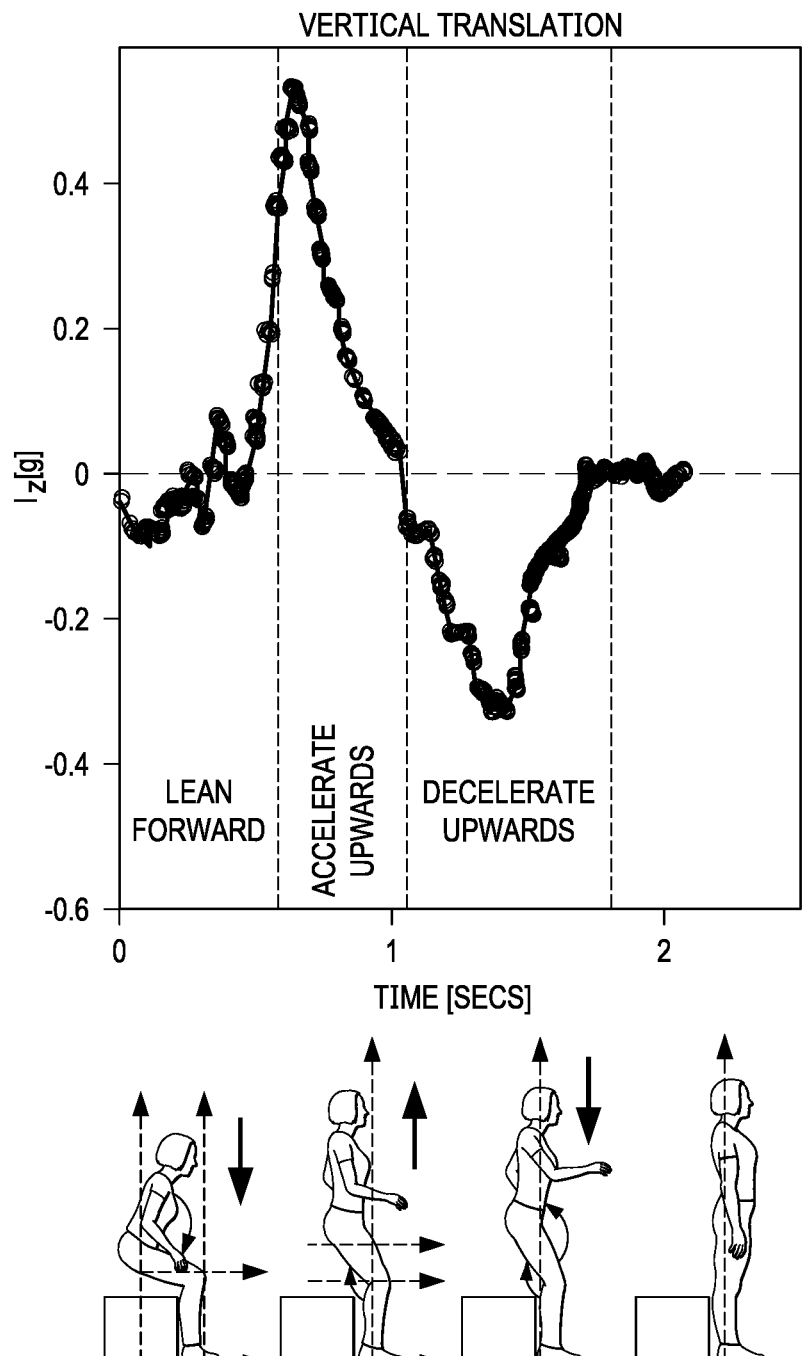
FIGS. 3A-3C illustrate the relationship between translation and rotation motion for each phase of a sit-to-stand posture transition, according to an embodiment.
Figure 3B:
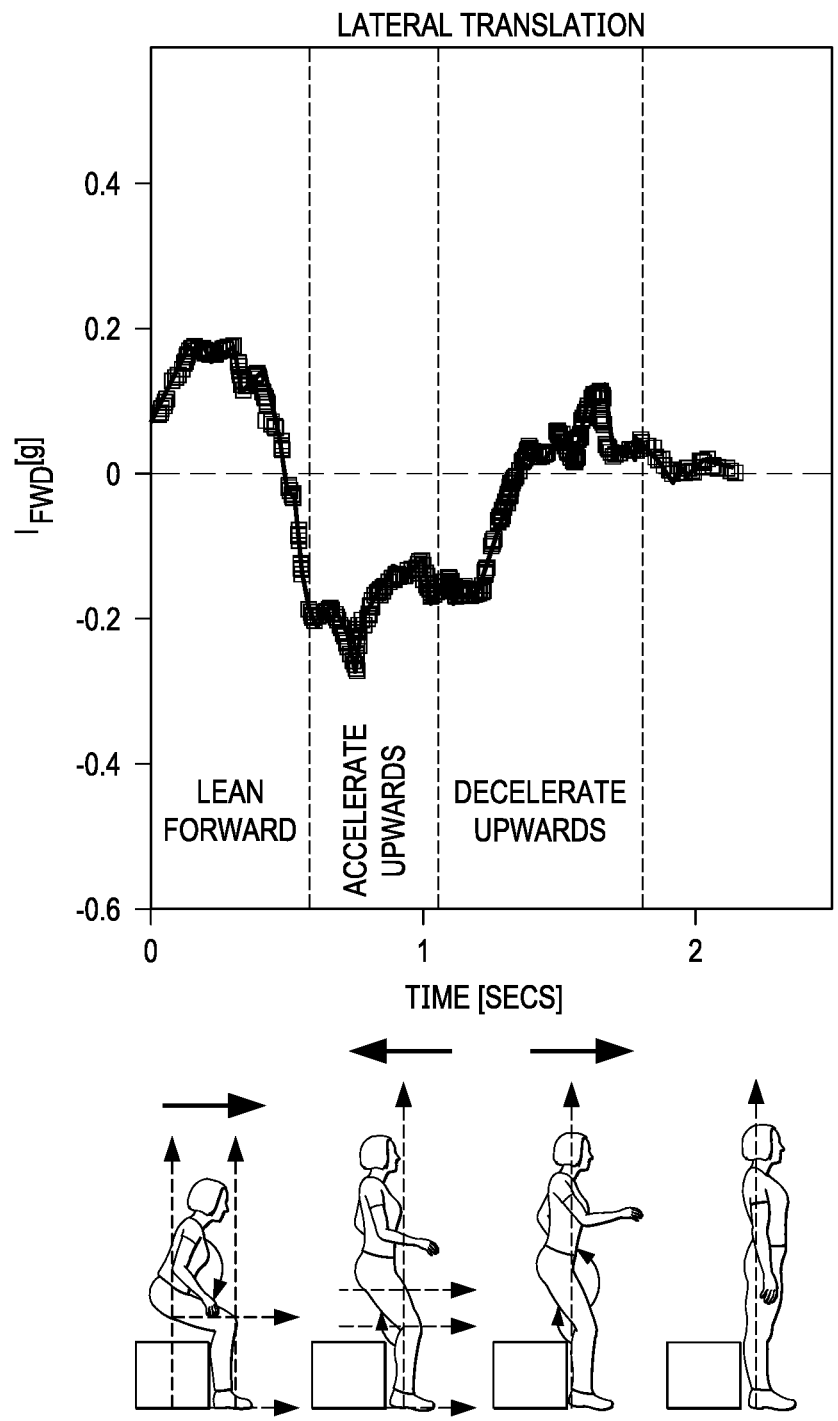
Figure 3C:
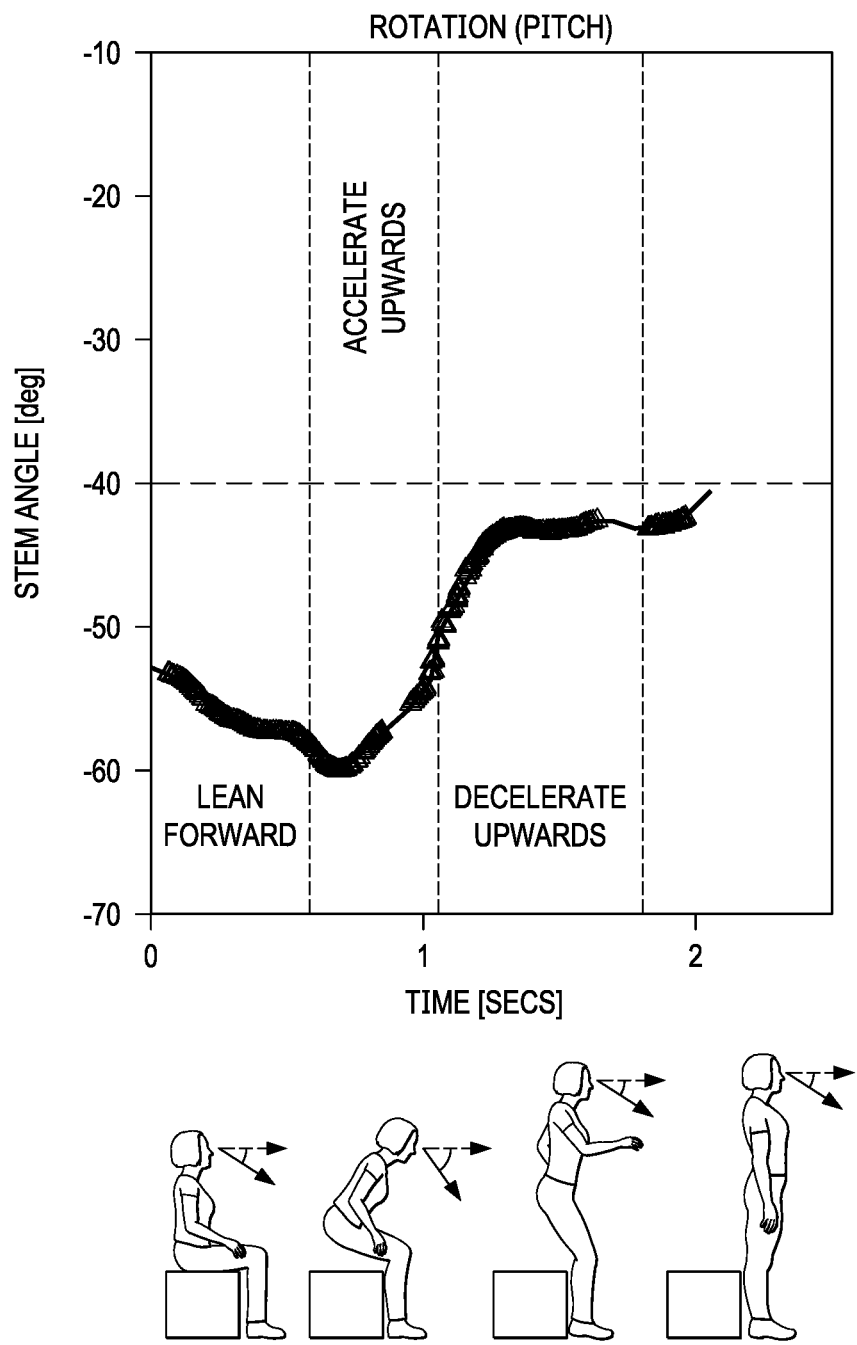

FIGS. 3A-3C illustrate the relationship between translation and rotation motion for each phase of a sit-to-stand transition shown in FIG. 2, according to an embodiment. The graph on shows vertical translation motion for the leaning, momentum and extension phases of a sit-to-stand user posture transition captured in a 2 second window of data. Note that the user leans forward and accelerates upwards in the first second and then decelerates in the next second. This results in vertical translation "signature" that is indicative of a sit-to-stand posture transition. Similarly, the center graph shows lateral translation, where the user leans forward, accelerates upwards in the first second and decelerates upwards in the next second. This results in a lateral translation "signature" that is indicative of a sit-to-stand posture transition. The right graph shows pitch rotation where the user leans forward and accelerates upwards in the first second and decelerates upwards in the next second. This results in a rotation "signature" that is indicative of a sit-to-stand posture transition. The combination of all three motion signatures indicates that a sit-to-stand posture transition has occurred. The same logic would be applied in reverse order for a stand-to-sit posture transition, or any other posture transition.

These three signature motions described above can be input into a trained machine learning model to be classified/labeled as a sit-to-stand posture transition. In an embodiment, the windows of data that include the signature motions are input into one or more classifiers. For example, a Naïve Bayes classifier can be used to classify the signature motions as sit-to-stand posture transition. In another embodiment, one or more neural networks can be used to classify the signature motions as sit-to-stand posture transition. In an embodiment, the signature motions can be embedded in images so that an image segmentation neural network can be used to classify the motions. In yet another embodiment, template matching can be used where the signature motions are compared to reference templates of signature motions from a database of signature motions using, for example, the method of least squares, or a distance metric such as Euclidian distance. The closest matching reference template determines the posture transition.

Figure 4:
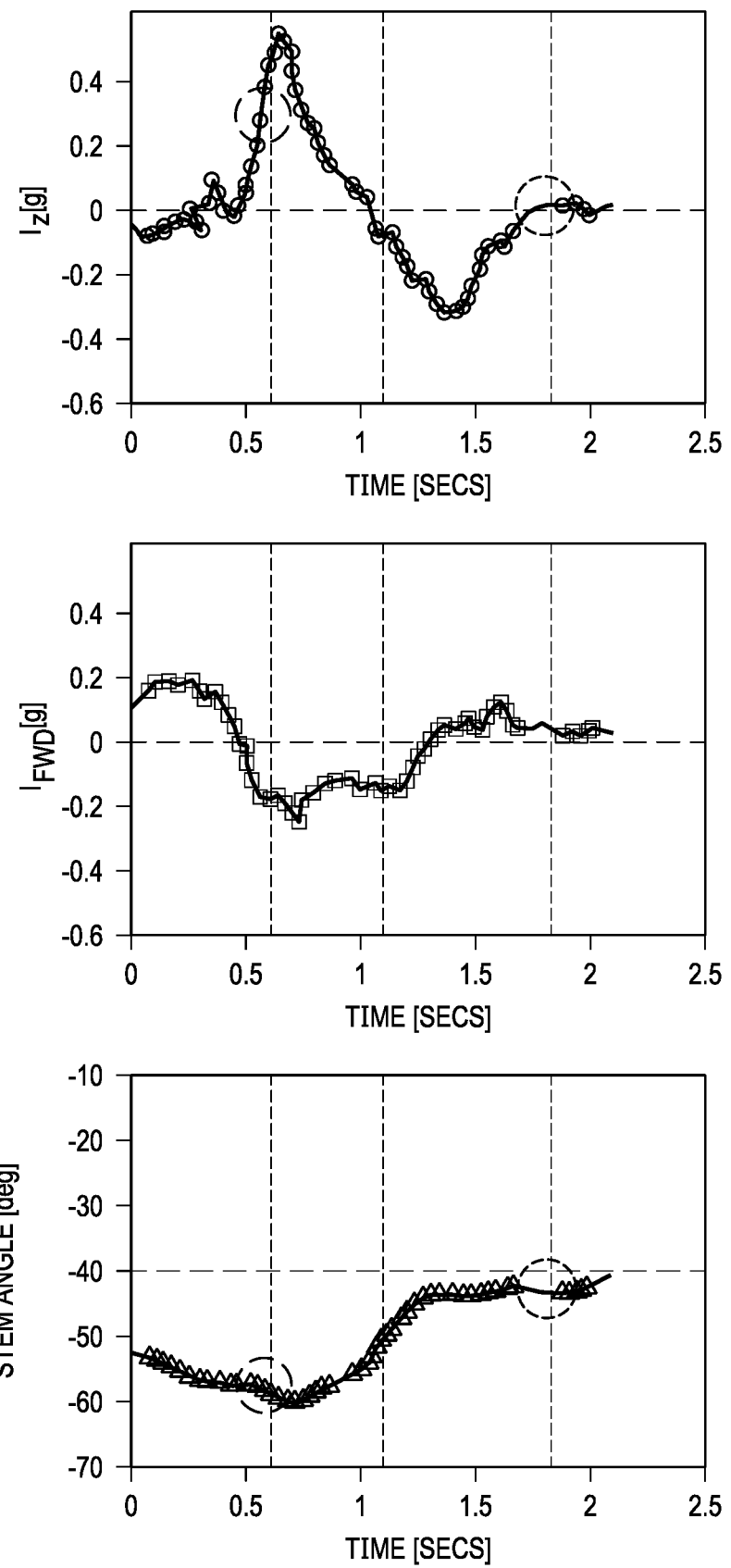
FIG. 4 illustrates using translation and rotation motion to localize an extension phase of a sit-to-stand posture transition, according to an embodiment.
Figure 5:
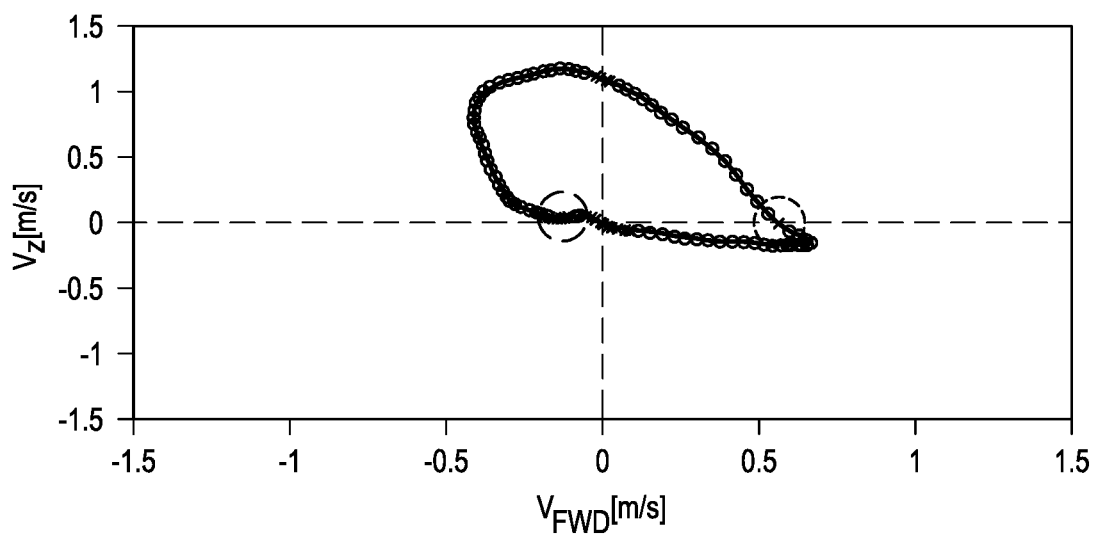
FIG. 5 illustrates that points of zero vertical velocity are boundaries to the extension phase of a sit-to-stand posture transition, according to an embodiment.
Figure 5:
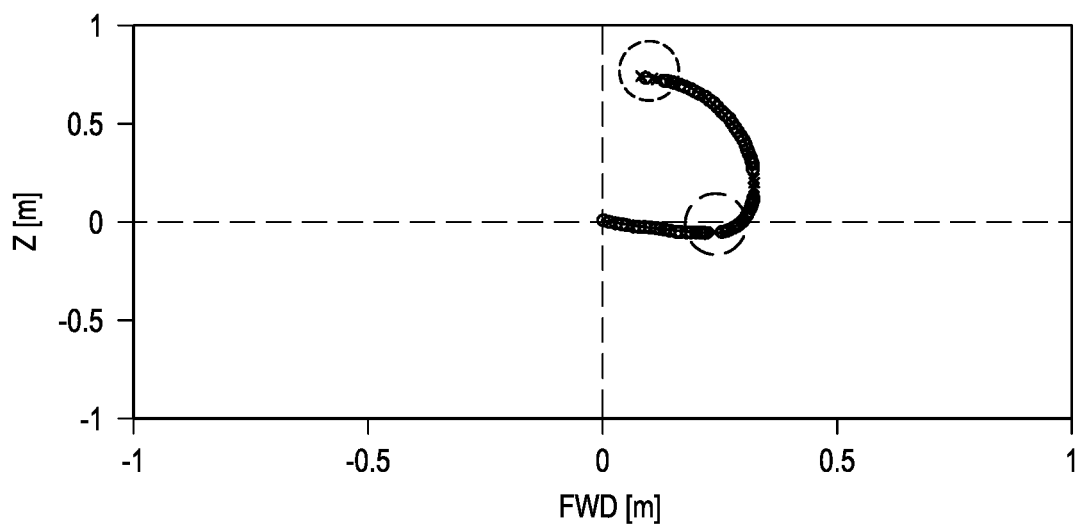

FIGS. 4 and 5 illustrate using translation and rotation motion to localize an extension phase of a sit-to-stand transition, according to an embodiment. Before a window motion data can be analyzed, the time boundaries of the window need to be determined. That is the system needs to detect when each phase of the user posture transition begins and ends. FIG. 4 shows the two second windows of motion data that include the signature vertical translation, lateral translation and rotation phases, described in reference to FIG. 3. FIG. 5 illustrates how points of zero vertical velocity are used to determine the time boundaries for the irreversible phase.

In the example shown, a vertical translation of zero occurring at the same time as a minimum pitch angle (at the 0.5 second mark) indicates the beginning of the irreversible phase, and a vertical translation of zero occurring at the same time as a maximum pitch angle (at the 2.0 second mark) indicates the end of the irreversible phase. Once the window is defined, motion data is accumulated before and after window and input into one or more classifiers, as described above.

Figure 6:
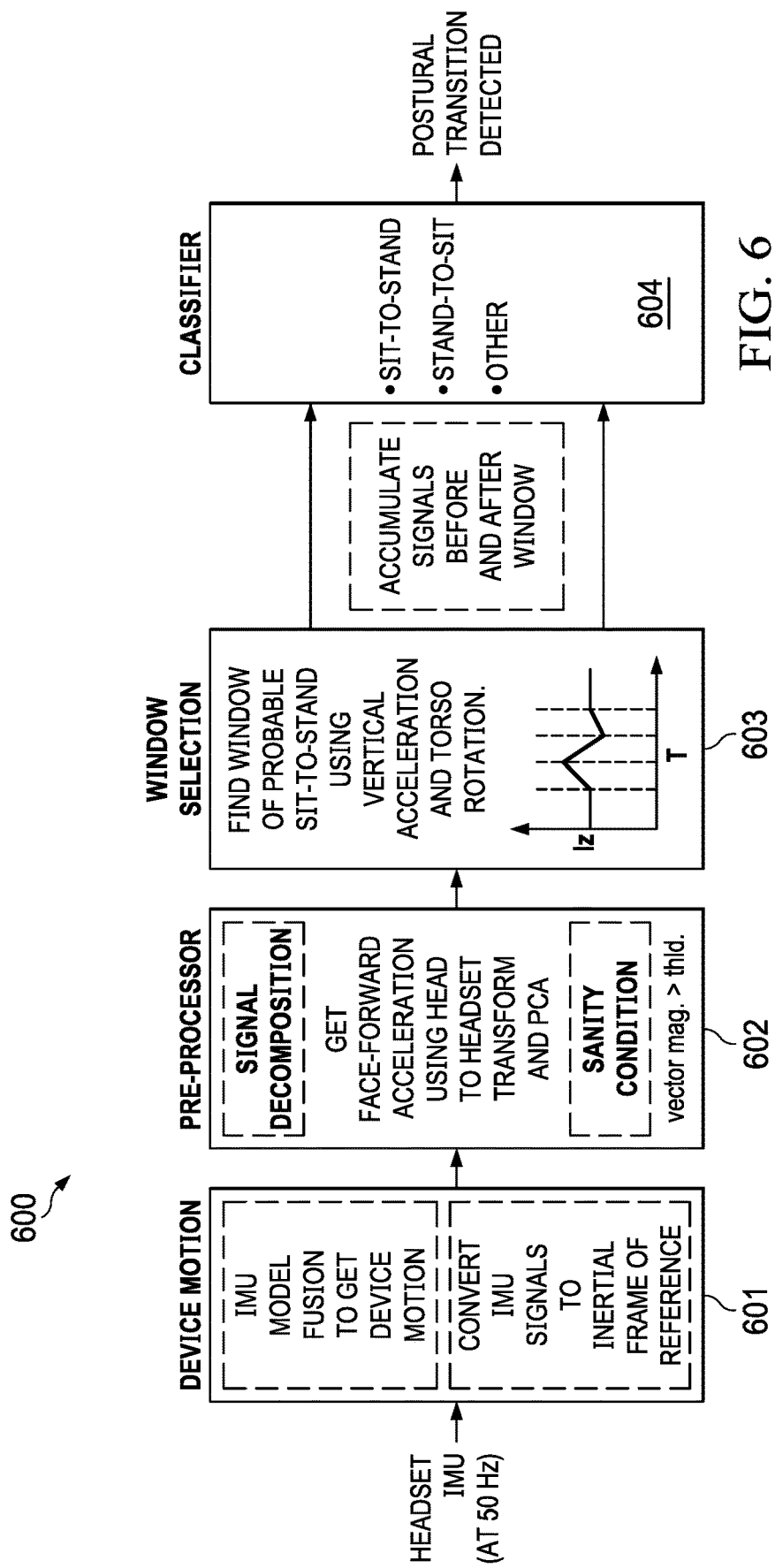
FIG. 6 is a block diagram of a system for user posture transition detection, according to an embodiment.

FIG. 6 is a block diagram of a system 600 for user posture transition detection, according to an embodiment. System 600 includes device motion module 601, pre-processor 602, window selector 603 and classifier. Device motion module 601 and classifier 604 were previously described in reference to FIG. 1. Window selector finds a window of a user posture transition using vertical acceleration and torso (pitch) rotation, as described in reference to FIGS. 4 and 5. Pre-processor 602 performs signal decomposition to determine a face-forward acceleration using a head/face to headset rotation transform and principal component analysis (PCA) to determine a dominant axis of the acceleration data in the head reference frame, where the dominant axis estimated by the PCA is an estimated face-forward acceleration direction. The head/face to headset rotation transform is needed because users will wear their headsets in differing positions on their head, e.g., tilted forward or backward. This would result in the forward-facing acceleration being inaccurate and could trigger false positives on user posture transitions. In certain applications (e.g., head tracking), the companion device includes a camera and face detector that provides face pose data. The face pose data can be used with estimated gravity vectors captured during quiescence conditions by the IMUs of the headset and companion device, to estimate the head/face to headset rotation transform using, for example, an extended Kalman filter or other estimator/predictor.

Figure 7A:
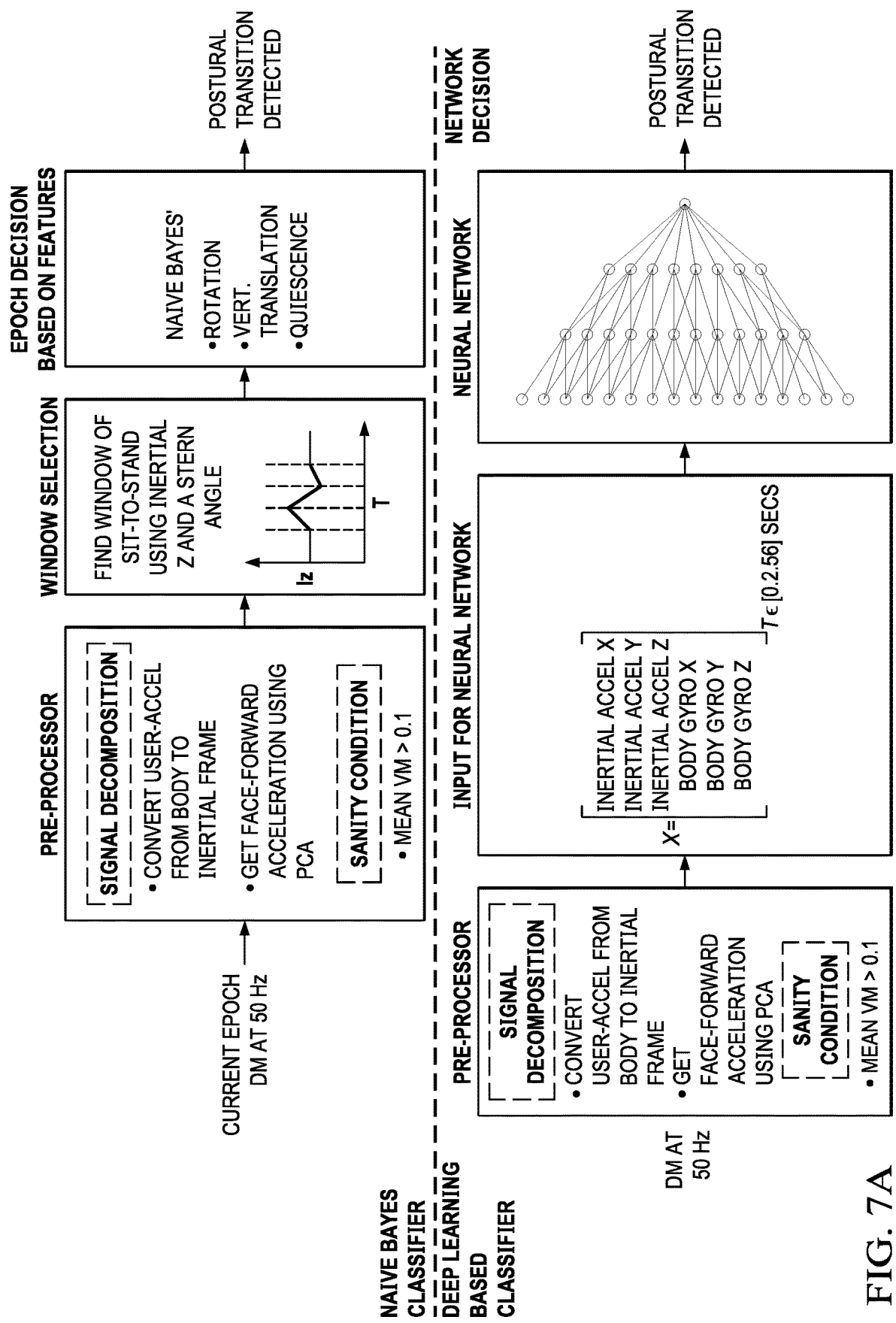
FIGS. 7A and 7B illustrate various classifier approaches for classifying a user posture transition, according to an embodiment.
Figure 7B:
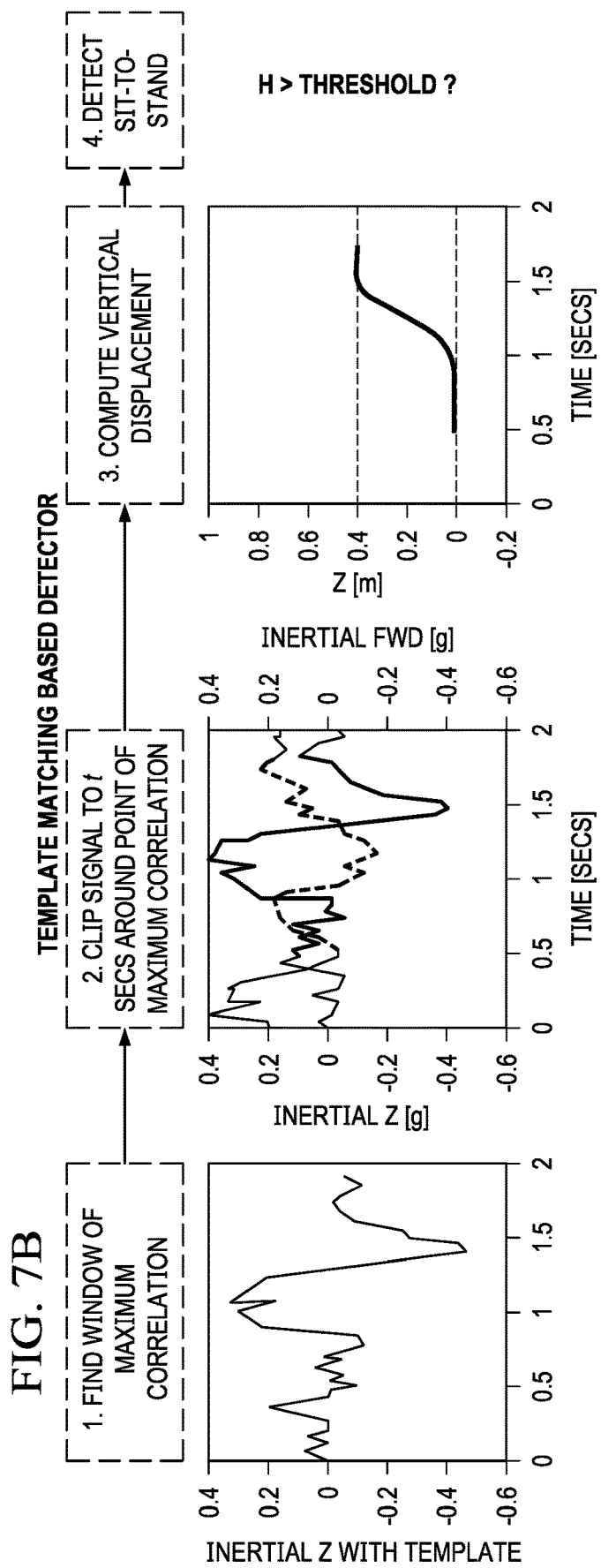

FIGS. 7A and 7B illustrate various classifier approaches for classifying a user posture transition, according to an embodiment. As previously described, several different classifiers can be used to classify the user posture transition, including but not limited to: Naïve Bayes, deep learning and template match classifiers. For example, a Naïve Bayes' classifier can make an epoch decision using the features of pitch rotation, vertical/lateral acceleration and quiescence conditions to detect the postural transition. The deep learning classifier can use one or more neural networks trained on windows of motion data that include vertical/lateral translations and pitch rotation motion signatures for classifying user posture transitions. Template matching classifiers can find a point of maximum correlation in the motion data and a database of template motion data, window the motion data to t seconds around the point of maximum correlation, compute vertical displacement at the point of maximum correlation and compare the displacement to a vertical displacement threshold to determine a match to a template.

Example Processes

Figure 8:
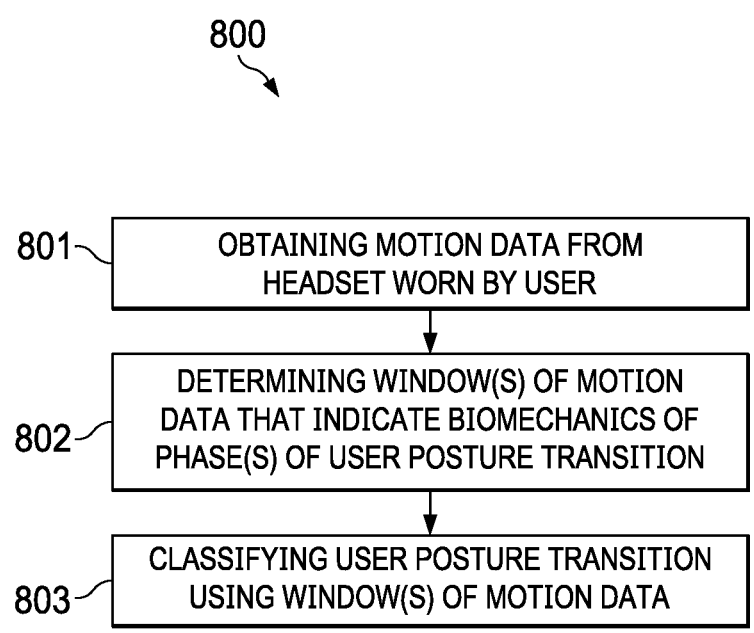
FIG. 8 is a flow diagram of a process of user posture detection and classification, according to an embodiment.

FIG. 8 is a flow diagram of process 800 of detecting and classifying user posture transitions, according to an embodiment. Process 800 can be implemented using, for example, the source device architecture 900 and/or headset architecture 1000, as described in reference to FIGS. 9 and 10, respectively.

Process 800 begins by obtaining, using one or more processors, motion data from a headset worn by a user. For example, acceleration and rotation rate can be obtained from a headset IMU. In an embodiment, relative motion is obtained by fusing the headset motion data with motion data from a companion device. Process 800 continues by determining, using the one or more processors, one or more windows of motion data that indicate biomechanics of one or more phases of a user posture transition. For example, points of zero velocity and maximum/minimum pitch angle can be used to determine the begin and end of an expansion phase of a sit-to-stand transition, as described in reference to FIGS. 3-7. Process 800 continues by classifying, using the one or more processors, as a user posture transition based on the one or more windows of data. Example classifiers include but are not limited to: a Naïve Bayes classifier, a deep learning classifier and a motion template matching classifier.

Example Software/Hardware Architectures

Figure 9:
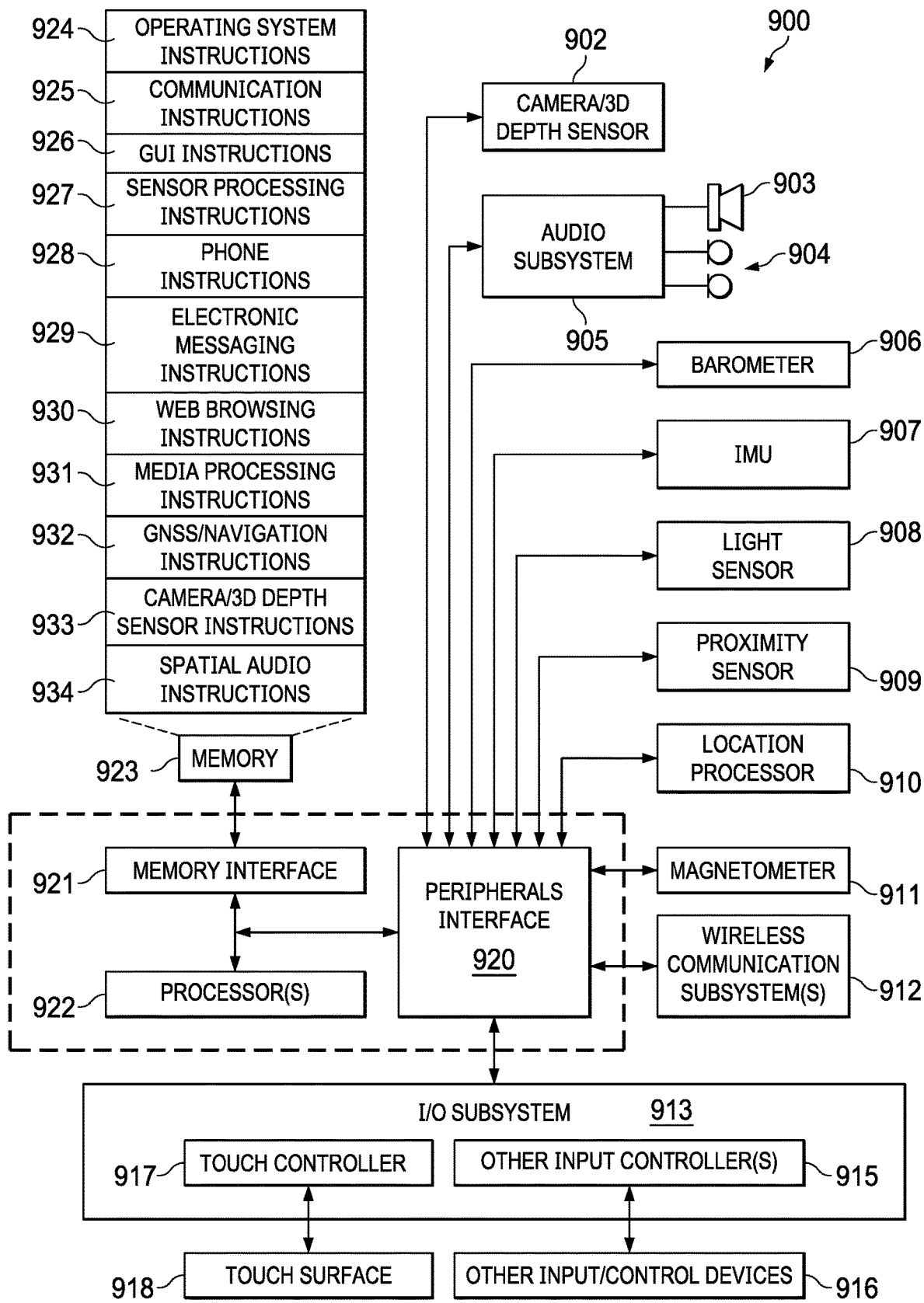
FIG. 9 a conceptual block diagram of a source device software/hardware architecture implementing the features and operations described in reference to FIGS. 1-8.

FIG. 9 is a conceptual block diagram of source device software/hardware architecture 900 implementing the features and operations described in reference to FIGS. 1-8. Architecture 900 can include memory interface 921, one or more data processors, digital signal processors (DSPs), image processors and/or central processing units (CPUs) 904 and peripherals interface 906. Memory interface 921, one or more processors 922 and/or peripherals interface 920 can be separate components or can be integrated in one or more integrated circuits.

Sensors, devices and subsystems can be coupled to peripherals interface 920 to provide multiple functionalities. For example, one or more motion sensors 907, light sensor 908 and proximity sensor 909 can be coupled to peripherals interface 920 to facilitate motion sensing (e.g., acceleration, rotation rates), lighting and proximity functions of the wearable computer. Location processor 910 can be connected to peripherals interface 920 to provide geo-positioning. In some implementations, location processor 910 can be a GNSS receiver, such as the Global Positioning System (GPS) receiver. Electronic magnetometer 911 (e.g., an integrated circuit chip) can also be connected to peripherals interface 920 to provide data that can be used to determine the direction of magnetic North. Electronic magnetometer 920 can provide data to an electronic compass application. Motion sensor(s) 907 can be an IMU that includes one or more accelerometers and/or gyros (e.g., 3-axis MEMS accelerometer and 3-axis MEMS gyro) configured to determine change of speed and direction of movement of the source device. Barometer 906 can be configured to measure atmospheric pressure around the mobile device.

Camera/3D depth sensor 902 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 912, which can include radio frequency (RF) receivers and transmitters (or transceivers) and/or optical (e.g., infrared) receivers and transmitters. The specific design and implementation of the wireless communication subsystem 912 can depend on the communication network(s) over which a mobile device is intended to operate. For example, architecture 900 can include communication subsystems 924 designed to operate over a GSM network, a GPRS network, an EDGE network, a Wi-Fi™ network and a Bluetooth™ network. In particular, the wireless communication subsystems 912 can include hosting protocols, such that the mobile device can be configured as a base station for other wireless devices.

Audio subsystem 905 can be coupled to a speaker 903 and one or more microphones 904 to facilitate voice-enabled functions, such as voice recognition, voice replication, digital recording and telephony functions. Audio subsystem 905 can be configured to receive voice commands from the user.

I/O subsystem 913 can include touch surface controller 917 and/or other input controller(s) 915. Touch surface controller 917 can be coupled to a touch surface 918. Touch surface 918 and touch surface controller 917 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 946. Touch surface 918 can include, for example, a touch screen or the digital crown of a smart watch. I/O subsystem 913 can include a haptic engine or device for providing haptic feedback (e.g., vibration) in response to commands from processor 922 or a digital signal processor (DSP). In an embodiment, touch surface 918 can be a pressure-sensitive surface.

Other input controller(s) 944 can be coupled to other input/control devices 948, such as one or more buttons, rocker switches, thumb-wheel, infrared port and USB port. The one or more buttons (not shown) can include an up/down button for volume control of speaker 903 and/or microphones 904. Touch surface 918 or other input control devices 916 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 918; and a pressing of the button for a second duration that is longer than the first duration may turn power to the mobile device on or off. The user may be able to customize a functionality of one or more of the buttons. The touch surface 918 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 921 can be coupled to memory 923. Memory 923 can include high-speed random access memory and/or non-volatile memory, such as one or more magnetic disk storage devices, one or more optical storage devices and/or flash memory (e.g., NAND, NOR). Memory 950 can store operating system 924, such as the iOS operating system developed by Apple Inc. of Cupertino, California Operating system 952 may include instructions for handling basic system services and for performing hardware dependent tasks. In some implementations, operating system 924 can include a kernel (e.g., UNIX kernel).

Memory 923 may also store communication instructions 925 to facilitate communicating with one or more additional devices, one or more computers and/or one or more servers, such as, for example, instructions for implementing a software stack for wired or wireless communications with other devices. Memory 923 may include graphical user interface instructions 926 to facilitate graphic user interface processing; sensor processing instructions 927 to facilitate sensor-related processing and functions; phone instructions 928 to facilitate phone-related processes and functions; electronic messaging instructions 929 to facilitate electronic-messaging related processes and functions; web browsing instructions 930 to facilitate web browsing-related processes and functions; media processing instructions 931 to facilitate media processing-related processes and functions; GNSS/Location instructions 932 to facilitate generic GNSS and location-related processes; and camera/3D depth sensor instructions 933 for capturing images (e.g., video, still images) and depth data (e.g., a point cloud). Memory 923 further includes head tracking instructions 934 for use in spatial audio applications, including but not limited AR and immersive video applications.

Each of the above identified instructions and applications can correspond to a set of instructions for performing one or more functions described above. These instructions need not be implemented as separate software programs, procedures, or modules. Memory 923 can include additional instructions or fewer instructions. Furthermore, various functions of the mobile device may be implemented in hardware and/or in software, including in one or more signal processing and/or application specific integrated circuits.

Figure 10:
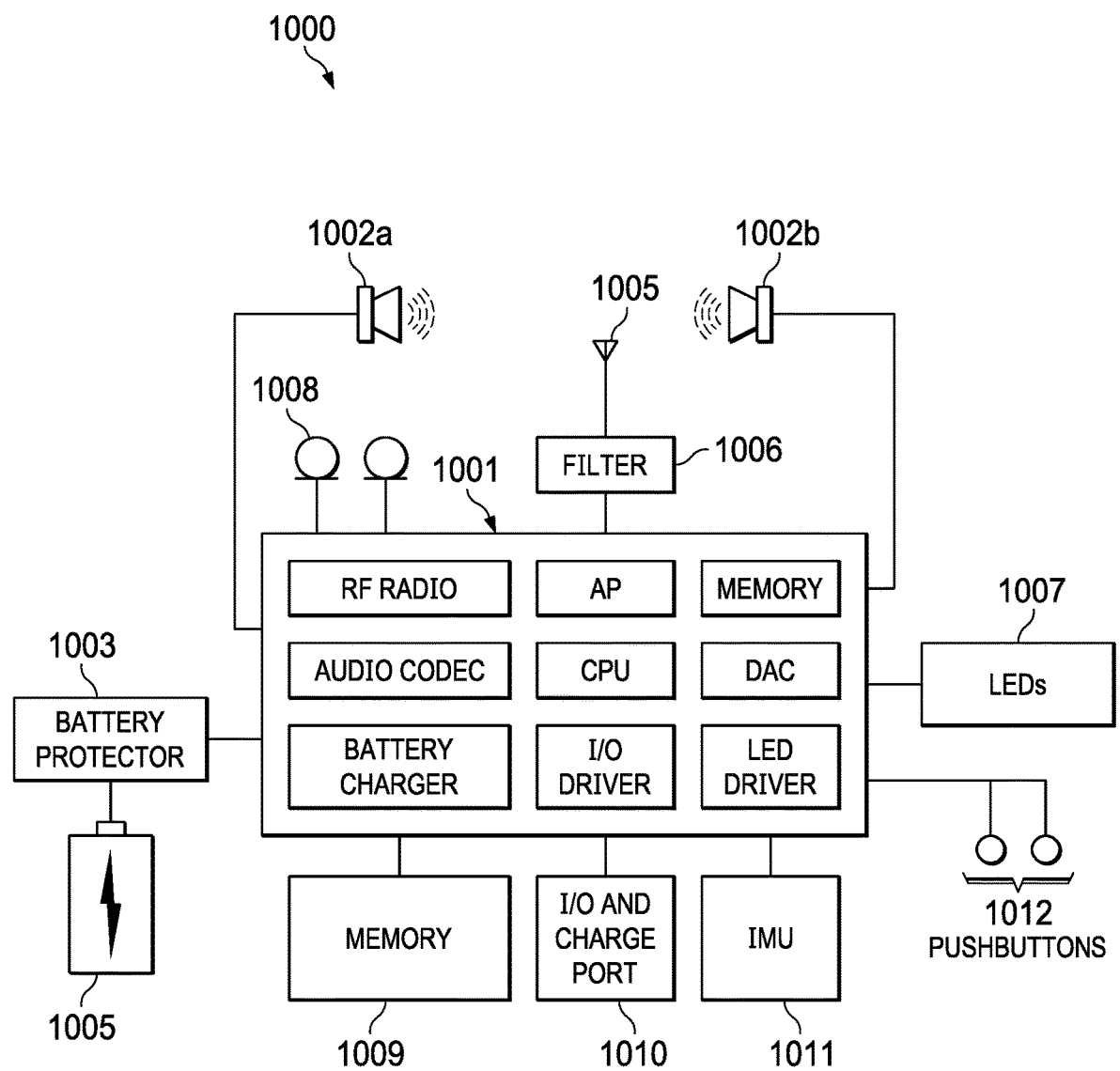
FIG. 10 a conceptual block diagram of a headset software/hardware architecture implementing the features and operations described in reference to FIGS. 1-8.

FIG. 10 is a conceptual block diagram of headset software/hardware architecture 1000 implementing the features and operations described in reference to FIGS. 1-8. In an embodiment, architecture 1000 can includes system-on-chip (SoC) 1001, stereo loudspeakers 1002a, 1002b (e.g., ear buds, headphones, ear phones), battery protector 1003, rechargeable battery 1004, antenna 1005, filter 1006, LEDs 1007, microphones 1008, memory 1009 (e.g., flash memory), I/O/Charge port 1010, IMU 1011 and pushbuttons 1012 for turning the headset on and off, adjusting volume, muting, etc. IMU 1011 was previously described in reference to FIGS. 1-8, and includes, for example, a 3-axis MEMS gyro and a 3-axis MEMS accelerometer.

SoC 1001 further includes various modules, such as a radio frequency (RF) radio (wireless transceiver) for wireless bi-directional communication with other devices, such as a source device 103, as described in reference to FIGS. 1-8. SoC 1001 further includes an application processor (AP) for running specific applications, memory (e.g., flash memory), central processing unit (CPU) for managing various functions of the headsets, audio codec for encoding/decoding audio, battery charger for charging/recharging rechargeable battery 1004, I/O driver for driving I/O and charge port (e.g., a micro USB port), digital to analog converter (DAC) converting digital audio into analog audio and LED driver for driving LEDs 1007. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    training a classifier to detect human posture transition;
    obtaining, with at least one processor, motion data from a headset reference frame associated with a headset worn by a user, the motion data including measurements of the user's inertial vertical acceleration and rotation about the user's torso in the headset reference frame;
    transforming, with the at least one processor, the user's inertial vertical acceleration from the headset reference frame to a head/face reference frame;
    determining, with the at least one processor, a dominant axis of the user's inertial vertical acceleration in the head/face reference frame;

determining, with the at least one processor, the user's face-forward inertial acceleration to be the dominant axis of the user's inertial vertical acceleration in the head/face reference frame;
determining, with the at least one processor, if the user's face-forward inertial acceleration meets or exceeds a minimum threshold;
in accordance with the user's face-forward inertial acceleration meeting or exceeding the minimum threshold, obtaining, with the at least one processor, one or more windows of motion data including the user's inertial vertical acceleration and the rotation about the user's torso;
detecting, with the trained classifier, a sit-to-stand or stand-to-sit posture transition of the user based on the one or more windows of motion data; and
determining, with the at least one processor, an activity of the user based on the user's posture transition.

2. The method of claim 1, wherein one or more phases of the user's posture transition include leaning, momentum and extension phases, and time boundaries of the extension phase are determined based on points of zero vertical inertial velocity derived from the user's inertial vertical acceleration, where the points of zero inertial vertical velocity correspond to maximum and minimum angles of the rotation about the user's torso.

3. The method of claim 2, wherein the user's posture transition is classified based on the one or more windows of motion data and additional motion data captured before and after each of the one or more windows of the motion data.

4. The method of claim 1, wherein the dominant axis is determined using principal component analysis.

5. A system comprising:
one or more processors;
memory storing instructions that when executed by the one or more processors, cause the one or more processors to perform operations comprising:
training a classifier to detect human posture transitions;
obtaining motion data from a headset reference frame associated with a headset worn by a user, the motion data including measurements of the user's inertial vertical acceleration and rotation about the user's torso in the headset reference frame;
transforming the user's inertial vertical acceleration from the headset reference frame to a head/face reference frame;
determining a dominant axis of the user's inertial vertical acceleration in the head/face reference frame;
determining the user's face-forward inertial acceleration to be the dominant axis of the user's inertial vertical acceleration in the head/face reference frame;
determining if the user's face-forward inertial acceleration meets or exceeds a minimum threshold;
in accordance with the user's face-forward inertial acceleration meeting or exceeding the minimum threshold, obtaining one or more windows of motion data including the user's inertial vertical acceleration and the rotation about the user's torso; and
detecting, with the trained classifier, a sit-to-stand or stand-to-sit posture transition of the user based on the one or more windows of motion data; and
determining an activity of the user based on the user's posture transition.

6. The system of claim 5, wherein one or more phases of the user's posture transition include leaning, momentum and extension phases, and time boundaries of the extension phase are determined based on points of zero vertical inertial velocity derived from the user's inertial vertical acceleration, where the points of zero inertial vertical velocity correspond to maximum and minimum angles of the rotation about the user's torso.

7. The system of claim 6, wherein the user's posture transition is classified based on the one or more windows of motion data and additional motion data captured before and after each of the one or more windows of the motion data.

8. The system of claim 5, wherein the dominant axis is determined using principal component analysis.

9. The method of claim 1, further comprising:
determining, by inertial sensors of the headset and a companion device coupled to the headset, a gravity vector during a quiescence condition;
estimating a head/face to headset rotation transform based on the gravity vector; and
transforming, with the head/face to headset rotation transform, the user's inertial vertical acceleration from the headset reference frame to the head/face reference frame.

10. The system of claim 5, where the operations further comprise:
determining, by inertial sensors of the headset and a companion device coupled to the headset, a gravity vector during a quiescence condition;
estimating a head/face to headset rotation transform using based on the gravity vector; and
transforming, with the head/face to headset rotation transform, the user's inertial vertical acceleration from the headset reference frame to the head/face reference frame.

* * * * *

UNITED STATES PATENT AND TRADEMARK OFFICE
CERTIFICATE OF CORRECTION

| | | |
|---|---|---|
| PATENT NO. | : 12,474,365 B2 | Page 1 of 1 |
| APPLICATION NO. | : 17/349883 | |
| DATED | : November 18, 2025 | |
| INVENTOR(S) | : Aditya Sarathy et al. | |

It is certified that error appears in the above-identified patent and that said Letters Patent is hereby corrected as shown below:

In the Claims

Column 10, Line 56, In Claim 1, delete "transition;" and insert -- transitions; --.

Signed and Sealed this
Sixth Day of January, 2026

John A. Squires
*Director of the United States Patent and Trademark Office*